US012774213B2

(12) United States Patent
Xue et al.

(10) Patent No.: US 12,774,213 B2
(45) Date of Patent: Oct. 27, 2026

(54) Y-TYPE MOLECULAR SIEVE AND SYNTHESIS METHOD THEREFOR

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

(72) Inventors: Jinghang Xue, Dalian (CN); Bo Qin, Dalian (CN); Hang Gao, Dalian (CN); Wei Liu, Dalian (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

( * ) Notice: Subject to any disclaimer, the term of this patent is extended or adjusted under 35 U.S.C. 154(b) by 600 days.

(21) Appl. No.: 18/259,839

(22) PCT Filed: Jan. 6, 2022

(86) PCT No.: PCT/CN2022/070485
§ 371 (c)(1),
(2) Date: Jun. 29, 2023

(87) PCT Pub. No.: WO2022/148394
PCT Pub. Date: Jul. 14, 2022

(65) Prior Publication Data

US 2024/0076193 A1 Mar. 7, 2024

(30) Foreign Application Priority Data

Jan. 7, 2021 (CN) ........................ 202110019016.7

(51) Int. Cl.
*C01B 39/00* (2006.01)
*B01J 29/08* (2006.01)
(Continued)

(52) U.S. Cl.
CPC ............ *C01B 39/24* (2013.01); *B01J 29/084* (2013.01); *B01J 35/45* (2024.01); *B01J 35/617* (2024.01);
(Continued)

(58) Field of Classification Search
CPC ......... C01B 39/24; B01J 35/45; B01J 35/633; B01J 35/635; B01J 35/70; B01J 35/617; B01J 2235/15; B01J 29/084
(Continued)

(56) References Cited

U.S. PATENT DOCUMENTS 3,516,786 A 6/1970 Maher et al.
5,851,378 A 12/1998 Vogt et al.
(Continued)

FOREIGN PATENT DOCUMENTS

CN 1032803 C 9/1996
CN 1033503 C 12/1996
(Continued)

OTHER PUBLICATIONS

Yin, Hailiang et al., "Synthesis of high-quality nanocrystalline zeolite Y using pseudoboehmite as aluminum source", Journal of Porous Materials, Apr. 19, 2011, vol. 19, No. 3, pp. 277-281.
(Continued)

*Primary Examiner* — James E Mcdonough
(74) *Attorney, Agent, or Firm* — NKL Law; Allen Xue

(57) ABSTRACT

A Y-type molecular sieve and a preparation method therefor are provided. The grain size of the molecular sieve is 20-100 nm, preferably 40-70 nm, and more preferably 50-60 nm. The molar ratio of silica/alumina in the molecular sieve is
(Continued)

4.5-7, preferably 5.0-6.5, and more preferably 6.0-6.5. The proportion of 40-70 nm grains in the molecular sieve that is measured by means of a dynamic photoelectron scattering method is 80%-95%, and preferably 85%-93%. The Y-type molecular sieve has a small grain size, concentrated grain distribution, high silica-alumina ratio and good hydrothermal stability, and can meet the needs of industrial production.

12 Claims, 2 Drawing Sheets

(51) Int. Cl.
*B01J 35/45* (2024.01)
*B01J 35/61* (2024.01)
*B01J 35/63* (2024.01)
*B01J 35/70* (2024.01)
*C01B 39/24* (2006.01)
*B01J 35/30* (2024.01)

(52) U.S. Cl.
CPC ........... *B01J 35/633* (2024.01); *B01J 35/635* (2024.01); *B01J 35/70* (2024.01); *B01J 35/30* (2024.01); *B01J 2235/15* (2024.01); *B01J 2235/30* (2024.01); *C01P 2002/72* (2013.01); *C01P 2004/03* (2013.01); *C01P 2004/64* (2013.01); *C01P 2006/12* (2013.01); *C01P 2006/14* (2013.01)

(58) Field of Classification Search
USPC .......................................................... 423/718
See application file for complete search history.

(56) References Cited

U.S. PATENT DOCUMENTS

| | | | |
|---|---|---|---|
| 2003/0147805 A1 | 8/2003 | Koegler et al. | |
| 2006/0116277 A1 | 6/2006 | Gao et al. | |
| 2020/0009541 A1 | 1/2020 | Zhou et al. | |

FOREIGN PATENT DOCUMENTS

| | | | | |
|---|---|---|---|---|
| CN | 1238306 | A | | 12/1999 |
| CN | 1621349 | A | | 6/2005 |
| CN | 1628077 | A | | 6/2005 |
| CN | 1683246 | A | * | 10/2005 |
| CN | 1789125 | A | | 6/2006 |
| CN | 1267345 | C | | 8/2006 |
| CN | 1323031 | C | | 6/2007 |
| CN | 101549874 | A | | 10/2009 |
| CN | 101767799 | A | | 7/2010 |
| CN | 101870478 | A | | 10/2010 |
| CN | 102616807 | A | | 8/2012 |
| CN | 104556121 | A | | 4/2015 |
| CN | 103449470 | B | | 5/2015 |
| CN | 104591214 | A | | 5/2015 |
| CN | 106672996 | A | * | 5/2017 |
| CN | 107662927 | A | | 2/2018 |
| CN | 110562995 | A | | 12/2019 |
| CN | 111087001 | A | | 5/2020 |
| CN | 111825105 | A | | 10/2020 |
| CN | 104828841 | A | | 8/2025 |
| EP | 0435625 | A2 | | 7/1991 |
| JP | S6191013 | A | | 5/1986 |
| JP | 2005519847 | A | | 7/2005 |
| RU | 2476378 | C1 | | 2/2013 |
| RU | 2670744 | C9 | | 12/2018 |
| SU | 1698188 | A1 | | 12/1991 |

OTHER PUBLICATIONS

Zhen, Tieli, "Synthesis and characterization of zeolite Y nanorods", Petroleum Processing and Petrochemicals, Sep. 2012, vol. 43, No. 9, pp. 1-3.

Han, Yixian, "A Study on Butylation of Toluene over Y zeolite catalysts", Chinese Master's Thesis Database, Apr. 2, 2020, pp. 1-69.

Tan, Juan et al.; "Hydrothermal Synthesis of Small Size NaY Zeolites with High Framework SiO2 /AI2O3 atio from oasted Kaolin"; Bulletin of the Chinese Ceramic Society; vol. 38, No. 12; Dec. 31, 2019; pp. 3927-3933.

* cited by examiner

Y-TYPE MOLECULAR SIEVE AND SYNTHESIS METHOD THEREFOR

CROSS-REFERENCE TO RELATED APPLICARTIONS

This application is a U.S. national stage entry of PCT International Application No. PCT/CN2022/070485, filed on Jan. 6, 2022, which claims the priority of the Chinese patent application No. 202110019016.7 filed on Jan. 7, 2021, the content of which is incorporated herein by reference in its entirety.

TECHNICAL FIELD

The invention belongs to the technical field of molecular sieve synthesis, and relates to a Y-type molecular sieve and a synthesis method therefor, particularly to a Y-type molecular sieve having a small grain size and a high silica-alumina ratio and a synthesis method therefor.

BACKGROUND ART

Y-type molecular sieves are molecular sieves having a FAU-type framework structure, the three-dimensional channel structure of Y-type molecular sieves is composed of interconnected pores of faujasite cage. Y-type molecular sieves have been widely used in catalysis, gas separation, adsorption, and ion exchange and other fields in recent years due to their unique structure and properties. Y-type molecular sieves have been put into use in the Fields of Catalytic Cracking (FCC) and hydrocracking for over 50 years, and have an industrially irreplaceable position due to the inherent properties such as a large specific surface area, a large pore volume, abundant acid-center active sites, desirable thermal and chemical stability.

The Y-type molecular sieves used in the industrial production at the earliest stage had a size of micron level, however, because of the longer channels in micron-sized Y-type molecular sieves, the product molecules are prone to diffuse through the channels and cause secondary cracking thereby lowering the liquid yield during the process of catalytic cracking, hydrocracking and hydroisomerization. In addition, the traditional Y-type molecular sieves without subjecting to the post-treatment have very small external surface areas and fairly limited conversion of the macromolecule polycyclic aromatic hydrocarbons. The Y-type molecular sieves having a small grain size are provided with a larger specific surface area while retaining the skeleton structure of Y-type molecular sieves, thus have attracted more and more attention.

Currently, there are several methods for synthesizing NaY molecular sieves with a small grain size:

1. A directing agent is added during the synthesis process, in order to improve the product properties by modifying the properties of the directing agent. For example, the Chinese patent application CN1033503C discloses a process for preparation of small crystal grain NaY molecular sieve, the method is performed by firstly adding the sodium silicate solution in the conventional directing agent whose light transmittance is less than 30%, to produce an improved directing agent whose light transmittance is more than 70%, the improved directing agent is subsequently added into the silica-alumina gel before crystallization to produce the small crystal grain NaY molecular sieve, the molecular sieve has a silica-alumina ratio being 5 or more, and a grain size about several hundred nanometers. CN1032803C discloses a synthetic method of small crystal grain NaY molecular sieve, such that the NaY molecular sieve with a grain size of 100-500 nm can be prepared, the method relates to firstly subjecting the silica-alumina gel to crystallization under the high temperature, and feeding the directing agent following the crystallization process, and continuously carrying out crystallization to prepare the final product.

2. The size of NaY molecular sieve is reduced by adding a surfactant or an organic dispersant. For example, CN103449470B discloses a synthesis method of highly-stable small-grain NaY molecular sieve by adding a highly alkali sodium metaaluminate solution into a water glass solution, stirring the solutions uniformly and then pouring into an aqueous solution of surfactant, producing an improved directing agent after aging, adding the directing agent to a material which is prepared according to a certain molar ratio, and carrying out crystallization for 8-72 hours to produce small-grain NaY molecular sieve. The grain size is within a range of 100-400 nm. U.S. Pat. No. 3,516,786 uses organic solvents to synthesize small-grain NaY molecular sieve. Water-soluble solvents such as methanol, ethanol, dimethylsulfoxide and dimethylformamide can be added to a silicon source or an aluminum source before gelling, or can be added after gel formation according to an addition amount of 0.1-20% of the gel amount. The small grain Y-type molecular sieve can be produced after crystallization.

3. A method for increasing alkalinity of the synthesis system. EP0435625A2 proposes a direct synthesis method of small grain Y-type molecular sieve by using a highly alkali silica-alumina gel, a particle size of the synthesized Y-type molecular sieve may be tens of nanometers. The method involves with firstly pouring an aqueous sodium aluminate solution into a highly alkali water glass solution, subjecting the gel to high speed agitation at a rotational speed of 3,000 rpm to convert the gel to a homogeneous mixture, a product can be prepared after aging and crystallization. However, the NaY molecular sieve prepared with the method has a relatively low $SiO_2/Al_2O_3$ ratio, a poor hydrothermal stability, thus the product can hardly be industrially applied.

The Y-type molecular sieves prepared with the aforementioned methods have too low silica-alumina ratio, or large grain size, or non-uniform particle size distribution, resulting in the defects such as easy collapse of the structure, low catalytic activity, unstable performance, and short catalyst life when the Y-type molecular sieves are used as the catalyst carrier.

SUMMARY OF THE INVENTION

The invention intends to solve the defects in the prior art, and provides a Y-type molecular sieve and synthesis method therefor, the Y-type molecular sieve simultaneously has the advantages of high silica-alumina ratio, small grain size, uniform particle size distribution, and good hydrothermal stability.

According to a first aspect, the invention provides a Y-type molecular sieve, wherein the grain size of the molecular sieve is 20-100 nm, preferably 40-70 nm, and more preferably 50-60 nm; the silica/alumina molar ratio of the molecular sieve is 4.5-7, preferably 5.0-6.5, and more preferably 6.0-6.5; the proportion of 40-70 nm grains in the molecular sieve that is measured by means of a dynamic light scattering method is 80% to 95%, preferably 85% to 93%.

Preferably, the Y-type molecular sieve of the invention has a specific surface area of 800-950 $m^2/g$, preferably 850-920 $m^2/g$, such as 810, 820, 830, 840, 850, 860, 870, 880, 890, 900, 905, 910, 914, 920, 930, 940, 948 $m^2/g$.

Preferably, the Y-type molecular sieve of the invention has an external specific surface area of 100-200 $m^2/g$, preferably 150-180 $m^2/g$.

Preferably, the molecular sieve has a R value of 4-9, such as 4, 5, 6, 6.2, 6.5, 7, 7.3, 7.8, 8, 8.5, 9, wherein R=specific surface area/external specific surface area.

Preferably, the Y-type molecular sieve of the invention has a pore volume not less than 0.36 mL/g, more preferably not less than 0.38 mL/g and not more than 0.56 mL/g, further preferably not more than 0.53 mL/g, further more preferably 0.43-0.53 mL/g, such as 0.44, 0.45, 0.46, 0.47, 0.48, 0.49, 0.50, 0.51, 0.52 mL/g.

The Y-type molecular sieve provided by the invention may be NaY, or HY after an ammonium exchange. When the Y-type molecular sieve is HY, the molecular sieve has a degree of crystallinity within a range of 75-90%, preferably 83-88%, after treatment under a high temperature water vapor atmosphere of 700° C. and 0.1 MPa for 2 h.

When the Y-type molecular sieve is NaY, the Y-type molecular sieve has a hydrothermal stability such that, after ammonium exchange, the molecular sieve has a degree of crystallinity within a range of 75-90%, preferably 83-88%, after treatment under a high temperature water vapor atmosphere of 700° C. and 0.1 MPa for 2 h.

The Y-type molecular sieve of the invention has a small particle size, thus it has a large external specific surface area, and the combined properties of Y-type molecular sieve and nanomaterial; due to a high silica-alumina ratio, Y-type molecular sieve has a good hydrothermal stability, and does not collapse easily; in addition, because of its uniform particle size distribution, the performance of the catalyst is stable.

According to a second aspect, the invention provides a synthetic method of a Y-type molecular sieve, the method comprises the following steps:

(1) mixing a silicon source, an aluminum source, an alkali source and water and subjecting the mixture to a first crystallization to obtain a directing agent A, the characteristic diffraction peaks belonging to Y-type molecular sieve are not observed from XRD spectrogram of the directing agent A;

(2) adding one or more of a silicon source, an aluminum source, an alkali source and water into the directing agent A and carrying out a second crystallization to obtain a directing agent B, which has a degree of crystallinity within a range of 5%-20%, preferably 8%-16%;

(3) adding one or more of a silicon source, an aluminum source, an alkali source and water into the directing agent B and carrying out a third crystallization;

wherein the molar ratio of $Na_2O$:$H_2O$ in step (1) is lower than the molar ratio of $Na_2O$:$H_2O$ in step (2) by 0.01-0.045, preferably 0.01-0.035, more preferably 0.015-0.030, further preferably 0.02-0.026.

In the process of the invention, the molar ratio of $Na_2O$:$H_2O$ in a system of step (2) (i.e., a crystallization system for preparing the directing agent B) is higher than the molar ratio of $Na_2O$:$H_2O$ in a system of step (3) (i.e., a crystallization system formed by further adding one or more of a silicon source, an aluminum source, an alkali source and water into the directing agent B) by 0.01-0.04, preferably 0.015-0.035, further preferably 0.023-0.033.

In the above method, the silicon source is preferably one or more selected from the group consisting of water glass, silica sol, silica and sodium silicate; the aluminum source is preferably one or more selected from the group consisting of sodium metaaluminate, aluminum powder, aluminum hydroxide and aluminum isopropoxide; and the alkali source is preferably one or more selected from the group consisting of hydroxide, tetraethylammonium hydroxide and tetrapropylammonium hydroxide.

The water is preferably distilled water.

In accordance with a specific embodiment of the invention, the method for synthesizing the Y-type molecular sieve specifically comprises the following steps:

(1) Dissolving an aluminum source, preferably sodium aluminate, in distilled water under the stirring conditions, then adding a silicon source, preferably water glass, and stirring uniformly, followed by the addition of sodium hydroxide, and continuously stirring, subjecting the gel to a constant temperature crystallization at a certain temperature for a period of time, and taking out the gel to obtain a solution of the incompletely crystallized Y-molecular sieve, which is denoted as a directing agent A. The directing agent A obtained in the meanwhile has some essential structural units, it as a whole exhibits an amorphous phase, the characteristic diffraction peak belonging to Y-type molecular sieve is not observed from XRD spectrogram of the directing agent A, that is, a degree of crystallinity is 0.

(2) Adding a certain amount of silicon source (e.g., a highly alkali water glass solution) and an aluminum source (e.g., a sodium aluminate solution) successively into the directing agent A obtained in step (1) under the stirring conditions, stirring uniformly, subjecting the materials to a constant temperature crystallization at a certain temperature, taking out the crystallization product and cooling to room temperature so as to obtain a directing agent B. In the meanwhile, the directing agent B has a degree of crystallinity of 5%-20%, preferably 8%-16%.

(3) Adding a low alkaline water glass, sodium aluminate solution into the directing agent B under the stirring conditions, subjecting the materials to a constant temperature crystallization at a certain temperature, subjecting the obtained solid product to a suction filtration, and washing it to neutral, and drying the washed product to prepare the product.

In the invention, the highly alkali water glass and the low alkaline water glass refer to a high level or low level of sodium hydroxide content in the water glass solution, the specific content of sodium hydroxide shall satisfy the required molar ratio of feedstock in the step.

In the method of the invention, the molar ratio of feedstock in step (1) is (7-14)$Na_2O$:$Al_2O_3$:(20-33)$SiO_2$:(300-650)$H_2O$, further preferably (9-12)$Na_2O$:$Al_2O_3$:(23-28)$SiO_2$:(350-550)$H_2O$.

In the method of the invention, the crystallization temperature of step (1) is 70-100° C., preferably 80-90° C.; the crystallization time is 4-12 hours, preferably 6-10 hours.

In the method of the invention, it is preferable that the directing agent A added in step (2) accounts for 25-38 wt %, more preferably 28-35 wt %, of the total mass of the directing agent B, based on the mass of $Al_2O_3$. By controlling the directing agent A within the above-mentioned specific proportion range, the grain size of the directing agent B can be controlled, thereby desirably ensuring that the grain size of the prepared Y-type molecular sieve falls within a desired range and the particle size distribution is uniform.

In the method of the invention, the feedstock molar ratio of directing agent B in step (2) is (17-26)$Na_2O$:$Al_2O_3$:(13-19)$SiO_2$:(400-618)$H_2O$, preferably (21-24)$Na_2O$:$Al_2O_3$:(15-17)$SiO_2$:(400-550)$H_2O$.

In the method of the invention, the crystallization temperature of step (2) is 40-70° C., preferably 50-65° C.; the crystallization time is 15-41 hours, preferably 18-28 hours.

In the above method, the first crystallization temperature (i.e., the crystallization temperature at which the directing agent A is prepared) is higher than the second crystallization temperature (i.e., the crystallization temperature at which the directing agent B is prepared) by 5-60° C., preferably 15-40° C. By controlling that the second crystallization is performed at a lower temperature, the grain size of the molecular sieve is smaller, and the formation of miscellaneous crystals is avoided.

Preferably, the first crystallization time is less than the second crystallization time by 8-37 h, more preferably 8-22 h.

In the method of the invention, the directing agent B added in step (3) accounts for 45-65 wt %, preferably 50-60 wt %, of the mass of the composition of the final sol (i.e., the feedstock subjected to the third crystallization) based on the mass of $Al_2O_3$.

In the method of the invention, after adding the water glass and sodium aluminate solution in step (3), the composition of the formed final sol is (12-20)$Na_2O$:$Al_2O_3$:(14-20)$SiO_2$:(550-1,050)$H_2O$, preferably (14-17)$Na_2O$:$Al_2O_3$:(16-18)$SiO_2$:(650-950)$H_2O$.

In the method of the invention, the crystallization temperature of step (3) is 80-105° C., preferably 90-100° C.; the crystallization time is 6-13 hours, preferably 8-12 hours.

Preferably, the third crystallization temperature is higher than the second crystallization temperature by 20-60° C., preferably 35-50° C.

Preferably, the third crystallization time is less than the second crystallization time by 5-35 hours, preferably 6-20 hours.

According to a preferred embodiment of the invention, the method of the invention further comprises subjecting the product obtained from the third crystallization to one or more ammonium exchanges to obtain the desired HY molecular sieve.

The ammonium exchange may be carried out in a known manner and conditions, for example, the ammonium exchanges are performed with 1.5 mol/L ammonium chloride solution at 70° C. for three times, a solid-solution ratio of each ammonium exchange is 1:10. The content will not be repeatedly described herein.

The synthesis method provided by the invention comprises firstly carrying out crystallization under the conditions of high silica-alumina ratio in the feedstock and a low alkalinity, forming a large amount of nanometer Y-type molecular sieve precursors which are not fully crystallized in the solution; then carrying out a second crystallization by increasing alkalinity of sol at a slightly lower temperature, so as to obtain nanometer seed crystals having a small grain size and a high silica-alumina ratio; on this basis, carrying out a third crystallization under the conditions of a low alkalinity and a high silica-alumina ratio, such that the silica-alumina ratio can be further increased, the degree of crystallinity is enhanced, and the skeleton structure is more complete, thereby preparing the Y-type molecular sieve having a small grain size, concentrated grain distribution, high silica-alumina ratio and good hydrothermal stability, and can meet the needs of industrial production. As a result, the synthesis method of the invention is suitable for industrial application.

DESCRIPTION OF THE PREFERRED EMBODIMENT

Figure 1:
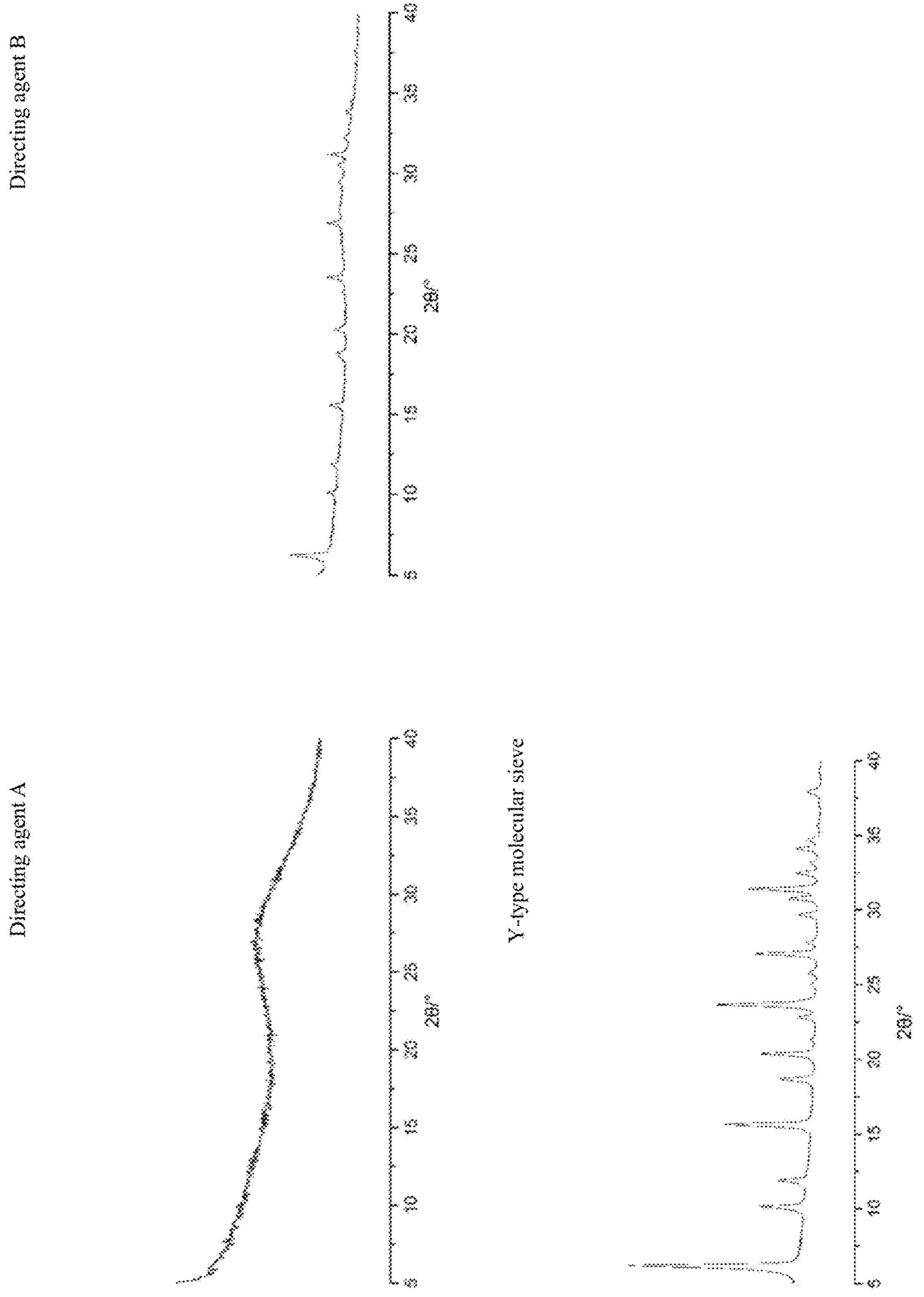
FIG. 1 illustrates XRD diffractograms of the directing agent A, directing agent B and Y-type molecular sieve prepared in Example 1 sequentially from left to right.

In the method of the invention, the degree of crystallinity of the directing agent A and director B was measured by using X-ray diffraction according to the method stipulated in the Chinese Petrochemical Industry Standard SH/T0340-92.

The measurement of hydrothermal stability of the Y-type molecular sieve referred to the degree of crystallinity of a sample after treatment under a high temperature water vapor atmosphere of 700° C. and 0.1 MPa for 2 h. The higher was the degree of crystallinity, it denoted that the better was the hydrothermal stability. The specific measurement method comprised the following steps: a sample was initially subjected to ammonium exchanges for three times with 1.5 mol/L of ammonium chloride solution at 70° C., the solid-to-liquid ratio by weight for each ammonium exchange was 1:10. The sample was then subjected to treatment under a high temperature water vapor atmosphere of 700° C. and 0.1 MPa for 2 h, the degree of crystallinity of said sample after the hydrothermal treatment was subsequently measured by using X-ray diffraction according to the method stipulated in the Chinese Petrochemical Industry Standard SH/T0340-92.

The specific surface area and pore volume of the molecular sieve were measured by using the $N_2$-adsorption desorption method. Before the measurement, the samples were first subjected to heat treatment at 300° C. for 3 h, and then tested by adsorbing nitrogen gas at 77K. The specific surface area of molecular sieve was calculated with the BET method, the total pore volume was measured at a place where $p/p^0=0.98$, and the external specific surface area was obtained through the t-Plot method.

The silicon-aluminum molar ratio of molecular sieve framework was measured by using X-ray diffraction method. The lattice cell parameter $a_0$ was measured using the Chinese Petrochemical Industry Standard SH/T0339-92, the lattice cell parameter was then introduced into the Breck equation $Si/Al=((192\times0.00868)/(a_0-24.191))-1$ to implement calculation. The resulting silicon-aluminum molar ratio was represented by $SiO_2/Al_2O_3$.

The grain size of molecular sieves was measured by using a Scanning Electron Microscopy (SEM).

The particle size distribution of molecular sieve was measured by using a dynamic light scattering (DLS) method stipulated in the method of the Chinese National Standard GB/T29022-2012.

The gel composition in each step was calculated based on the feeding amount.

The catalytic cracking performance of molecular sieves was tested by using 1,3,5-triisopropylbenzene (TIPB) as a model compound. The reaction was carried out in a fixed bed reactor, 2 g of a sieved 20-40 mesh HY molecular sieve was weighted and filled into a reactor. The catalyst was first subjected to an $N_2$ purge at normal temperature for 30 min, and the $N_2$ flow rate was controlled at 50 mL/min. The temperature was subsequently raised to 500° C. to carry out activization, and the temperature was reduced to 450° C. after the activation process, the feedstock was introduced at a flow rate of 12 mL/h. The reaction products were analyzed by using the Agilent 7890B gas phase chromatograph (FID detector), and the results of Table 2 below illustrated the compositions of the products collected after the reaction was performed for 48 hours and entered a stationary phase.

The preparation processes and product properties of the method of the invention were further demonstrated below with reference to the Examples and Comparative Examples, but the following Examples did not impose limitation to the method of the invention.

Example 1

(1) Sodium aluminate was dissolved in distilled water under stirring conditions, a water glass solution was then added and stirred to homogenize the gel, a sodium hydroxide solution was subsequently added and continuously stirred, the composition of finally formed gel was $9Na_2O:Al_2O_3:23.0SiO_2:550H_2O$. The gel was crystallized for 10 h under a constant temperature of 80° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $23Na_2O:Al_2O_3:16SiO_2:550H_2O$, the directing agent A accounted for 28 wt % of the total gel mass (based on the percentage content of $Al_2O_3$ in the gel). The gel was crystallized for 18 h under a constant temperature of 65° C., the gel was taken out and cooled to room temperature, the cooled gel was denoted as the directing agent B, the degree of crystallinity was 13%.

Figure 2:
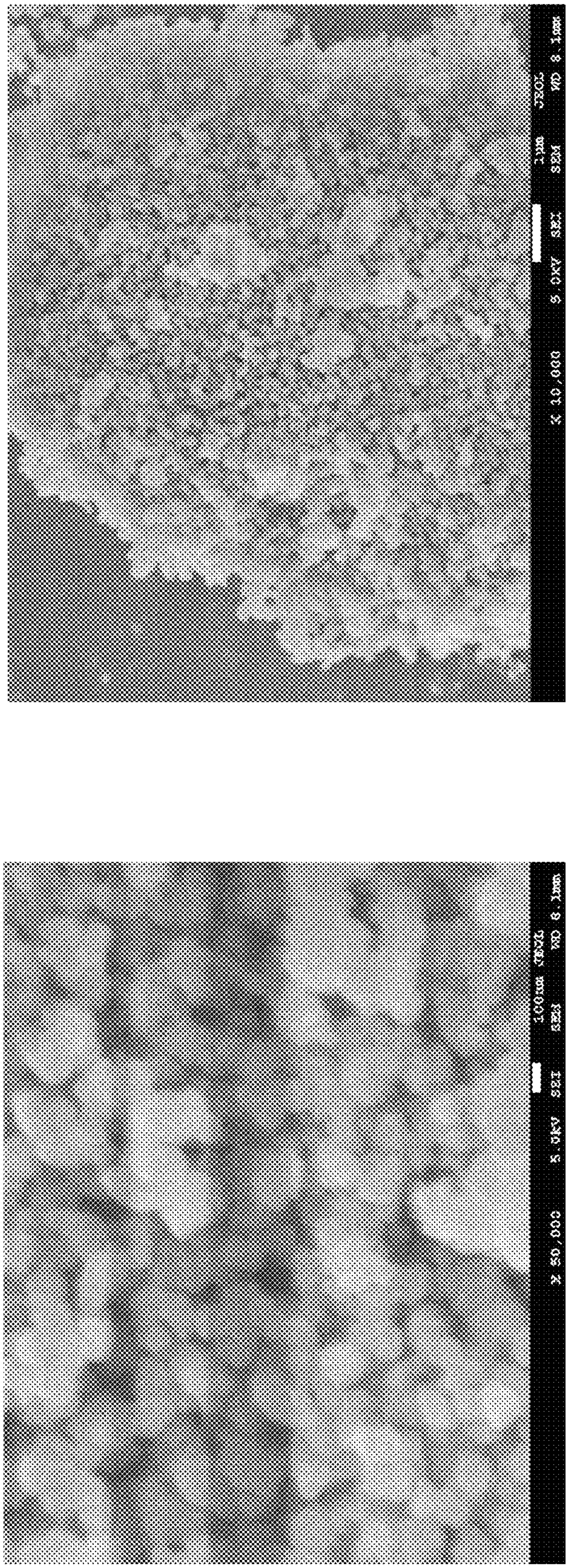
FIG. 2 shows a Scanning Electron Microscopy (SEM) image at 10 k magnification and a SEM image at 50 k magnification of the Y-type molecular sieve prepared in Example 1.

(3) A water glass solution and a sodium aluminate solution were added to the directing agent B under stirring conditions, the composition of the finally formed gel was $15Na_2O:Al_2O_3:18SiO_2:820H_2O$, the directing agent B accounted for 50 wt % of the total gel mass (based on the percentage content of $Al_2O_3$ in the gel). The gel was crystallized for 12 h under a constant temperature of 90° C., the gel was cooled to room temperature, then filtered and dried to obtain the final product. The XRD spectrograms of the products obtained by crystallization of step (1), step (2) and step (3) were shown in FIG. 1. The SEM image at 10 k magnification and the SEM image at 50 k magnification of the Y-type molecular sieve prepared in Example 1 were illustrated in FIG. 2.

Example 2

(1) Sodium aluminate was dissolved in distilled water under stirring conditions, a water glass solution was then added and stirred to homogenize the gel, a sodium hydroxide solution was subsequently added and continuously stirred, the composition of finally formed gel was $12.0Na_2O:Al_2O_3:25SiO_2:450H_2O$. The gel was crystallized for 6 h under a constant temperature of 90° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $21Na_2O:Al_2O_3:17SiO_2:440H_2O$, the directing agent A accounted for 35 wt % of the total gel mass (based on the percentage content of $Al_2O_3$ in the gel). The gel was crystallized for 28 h under a constant temperature of 50° C., the gel was taken out and cooled to room temperature, the cooled gel was denoted as the directing agent B, the degree of crystallinity was 18%.

(3) A water glass solution and a sodium aluminate solution were added to the directing agent B under stirring conditions, the composition of the finally formed gel was $14Na_2O:Al_2O_3:17SiO_2:950H_2O$, the directing agent B accounted for 60 wt % of the total gel mass (based on the percentage content of $Al_2O_3$ in the gel). The gel was crystallized for 8 h under a constant temperature of 100° C., the gel was cooled to room temperature, then filtered and dried to obtain the final product.

Example 3

(1) Sodium aluminate was dissolved in distilled water under stirring conditions, a water glass solution was then added and stirred to homogenize the gel, a sodium hydroxide solution was subsequently added and continuously stirred, the composition of finally formed gel was $10.5Na_2O:Al_2O_3:28SiO_2:350H_2O$. The gel was crystallized for 8 h under a constant temperature of 85° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $21.5Na_2O:Al_2O_3:15SiO_2:400H_2O$, the directing agent A accounted for 33 wt % of the total gel mass (based on the percentage content of $Al_2O_3$ in the gel). The gel was crystallized for 25 h under a constant temperature of 60° C., the gel was taken out and cooled to room temperature, the cooled gel was denoted as the directing agent B, the degree of crystallinity was 14%.

(3) A water glass solution and a sodium aluminate solution were added to the directing agent B under stirring conditions, the composition of the finally formed gel was $17Na_2O:Al_2O_3:16SiO_2:660H_2O$, the directing agent B accounted for 55 wt % of the total gel mass (based on the percentage content of $Al_2O_3$ in the gel). The gel was crystallized for 10 h under a constant temperature of 100° C., the gel was cooled to room temperature, then filtered and dried to obtain the final product.

Example 4

(1) Sodium aluminate was dissolved in distilled water under stirring conditions, a water glass solution was then added and stirred to homogenize the gel, a sodium hydroxide solution was subsequently added and continuously stirred, the composition of finally formed gel was $10Na_2O:Al_2O_3:20SiO_2:640H_2O$. The gel was crystallized for 12 h under a constant temperature of 70° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $25.6Na_2O:Al_2O_3:19SiO_2:420H_2O$, the directing agent A accounted for 30 wt % of the total gel mass (based on the percentage content of $Al_2O_3$ in the gel). The gel was crystallized for 25 h under a constant temperature of 55° C., the gel was taken out and cooled to room temperature, the cooled gel was denoted as the directing agent B, the degree of crystallinity was 10%.

(3) A water glass solution and a sodium aluminate solution were added to the directing agent B under stirring conditions, the composition of the finally formed gel was $20Na_2O:Al_2O_3:18SiO_2:950H_2O$, the directing agent B accounted for 65 wt % of the total gel mass (based on the percentage content of $Al_2O_3$ in the gel). The gel was crystallized for 6 h under a constant temperature of 105° C., the gel was cooled to room temperature, then filtered and dried to obtain the final product.

Example 5

(1) Sodium aluminate was dissolved in distilled water under stirring conditions, a water glass solution was then added and stirred to homogenize the gel, a sodium hydroxide solution was subsequently added and continuously stirred, the composition of finally formed gel was $14.0Na_2O:Al_2O_3:33SiO_2:520H_2O$. The gel was crystallized for 4 h under a constant temperature of 75° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $17.0Na_2O:Al_2O_3:16SiO_2:400H_2O$, the directing agent A accounted for 25 wt % of the total gel mass (based on the percentage content of $Al_2O_3$ in the gel). The gel was crystallized for 15 h under a constant temperature of 70° C., the gel was taken out and cooled to room temperature, the cooled gel was denoted as the directing agent B, the degree of crystallinity was 20%.

(3) A water glass solution and a sodium aluminate solution were added to the directing agent B under stirring conditions, the composition of the finally formed gel was $12Na_2O:Al_2O_3:14SiO_2:1,050H_2O$, the directing agent B accounted for 45 wt % of the total gel mass (based on the percentage content of $Al_2O_3$ in the gel). The gel was crystallized for 10 h under a constant temperature of 90° C., the gel was cooled to room temperature, then filtered and dried to obtain the final product.

Example 6

(1) Sodium aluminate was dissolved in distilled water under stirring conditions, a water glass solution was then added and stirred to homogenize the gel, a sodium hydroxide solution was subsequently added and continuously stirred, the composition of finally formed gel was $7.0Na_2O:Al_2O_3:26SiO_2:300H_2O$. The gel was crystallized for 8 h under a constant temperature of 100° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $23.0Na_2O:Al_2O_3:13SiO_2:615H_2O$, the directing agent A accounted for 38 wt % of the total gel mass (based on the percentage content of $Al_2O_3$ in the gel). The gel was crystallized for 16 h under a constant temperature of 40° C., the gel was taken out and cooled to room temperature, the cooled gel was denoted as the directing agent B, the degree of crystallinity was 10%.

(3) A water glass solution and a sodium aluminate solution were added to the directing agent B under stirring conditions, the composition of the finally formed gel was $15Na_2O:Al_2O_3:20SiO_2:550H_2O$, the directing agent B accounted for 55 wt % of the total gel mass (based on the percentage content of $Al_2O_3$ in the gel). The gel was crystallized for 10 h under a constant temperature of 85° C., the gel was cooled to room temperature, then filtered and dried to obtain the final product.

Example 7

(1) Sodium aluminate was dissolved in distilled water under stirring conditions, a water glass solution was then added and stirred to homogenize the gel, a sodium hydroxide solution was subsequently added and continuously stirred, the composition of finally formed gel was $12Na_2O:Al_2O_3:20SiO_2:530H_2O$. The gel was crystallized for 6 h under a constant temperature of 90° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $17Na_2O:Al_2O_3:14SiO_2:420H_2O$, the directing agent A accounted for 35 wt % of the total gel mass (based on the percentage content of $Al_2O_3$ in the gel). The gel was crystallized for 31 h under a constant temperature of 60° C., the gel was taken out and cooled to room temperature, the cooled gel was denoted as the directing agent B, the degree of crystallinity was 6%.

(3) A water glass solution and a sodium aluminate solution were added to the directing agent B under stirring conditions, the composition of the finally formed gel was $20Na_2O:Al_2O_3:16SiO_2:800H_2O$, the directing agent B accounted for 55 wt % of the total gel mass (based on the percentage content of $Al_2O_3$ in the gel). The gel was crystallized for 10 h under a constant temperature of 95° C., the gel was cooled to room temperature, then filtered and dried to obtain the final product.

Example 8

(1) Sodium aluminate was dissolved in distilled water under stirring conditions, a water glass solution was then added and stirred to homogenize the gel, a sodium hydroxide solution was subsequently added and continuously stirred, the composition of finally formed gel was $12Na_2O:Al_2O_3:25SiO_2:500H_2O$. The gel was crystallized for 4 h under a constant temperature of 70° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $17Na_2O:Al_2O_3:15SiO_2:500H_2O$, the directing agent A accounted for 30 wt % of the total gel mass (based on the percentage content of $Al_2O_3$ in the gel). The gel was crystallized for 24 h under a constant temperature of 40° C., the gel was taken out and cooled to room temperature, the cooled gel was denoted as the directing agent B, the degree of crystallinity was 10%.

(3) A water glass solution and a sodium aluminate solution were added to the directing agent B under stirring conditions, the composition of the finally formed gel was $14.4Na_2O:Al_2O_3:16SiO_2:800H_2O$, the directing agent B accounted for 62 wt % of the total gel mass (based on the percentage content of $Al_2O_3$ in the gel). The gel was crystallized for 6 h under a constant temperature of 100° C., the gel was cooled to room temperature, then filtered and dried to obtain the final product.

Example 9

(1) Sodium aluminate was dissolved in distilled water under stirring conditions, a water glass solution was then added and stirred to homogenize the gel, a sodium hydroxide solution was subsequently added and continuously stirred, the composition of finally formed gel was $12Na_2O:Al_2O_3:22SiO_2:500H_2O$. The gel was crystallized for 5 h under a constant temperature of 80° C., the gel was taken out and cooled to room temperature to obtain the directing agent A. The characteristic diffraction peak belonging to Y-type molecular sieve was not observed from XRD spectrogram of the directing agent A.

(2) A water glass solution and a sodium aluminate solution were added successively to the directing agent A under stirring conditions, the composition of the formed gel was $25Na_2O:Al_2O_3:17SiO_2:500H_2O$, the directing agent A accounted for 35 wt % of the total gel mass (based on the percentage content of $Al_2O_3$ in the gel). The gel was crystallized for 9 h under a constant temperature of 60° C., the gel was taken out and cooled to room temperature, the cooled gel was denoted as the directing agent B, the degree of crystallinity was 8%.

(3) A water glass solution and a sodium aluminate solution were added to the directing agent B under stirring conditions, the composition of the finally formed gel was $20Na_2O:Al_2O_3:18SiO_2:800H_2O$, the directing agent B accounted for 60 wt % of the total gel mass (based on the percentage content of $Al_2O_3$ in the gel). The gel was crystallized for 13 h under a constant temperature of 90° C., the gel was cooled to room temperature, then filtered and dried to obtain the final product.

Comparative Example 1

The Y-type molecular sieve was prepared according to the method in Example 9, except that the directing agent B was not prepared, the final crystallization was carried out by adding a water glass solution and a sodium aluminate solution into the directing agent A directly under stirring conditions. The directing agent A accounted for 60 wt % of the total gel mass (based on the percentage content of $Al_2O_3$ in the gel), the composition of the finally formed gel was $20Na_2O:Al_2O_3:18SiO_2:800H_2O$.

Comparative Example 2

The Y-type molecular sieve was prepared according to the method in Example 9, except that the directing agent A was not prepared, the directing agent B was prepared directly according to the gel composition of $25Na_2O:Al_2O_3:17SiO_2:500H_2O$, the directing agent B was then added to carry out a final crystallization. The directing agent B accounted for 60 wt % of the total gel mass (based on the percentage content of $Al_2O_3$ in the gel), the composition of the finally formed gel was $20Na_2O:Al_2O_3:18SiO_2: 800H_2O$.

Comparative Example 3

The Y-type molecular sieve was prepared according to the method in Example 9, except that the composition of gel in step (2) was $37Na_2O:Al_2O_3:17SiO_2:500H_2O$.

Comparative Example 4

The Y-type molecular sieve was prepared according to the method in Example 9, except that the constant temperature crystallization of step (1) was carried out at 70° C. for 24 h, the degree of crystallinity of the directing agent A in the XRD test was 25%.

Comparative Example 5

The Y-type molecular sieve was prepared according to the method in Example 9, except that the constant temperature crystallization of step (2) was carried out at 65° C. for 50 h, the degree of crystallinity of the directing agent B in the XRD test was 45%.

The product properties of the aforesaid Examples and Comparative Examples were shown in Table 1.

TABLE 1

Structural properties of the products in Examples and Comparative Examples

| | Specific surface area, $m^2/g$ | External specific surface area, $m^2/g$ | Pore volume, mL/g | Silica-alumina ratio | Grain distribution, nm | Proportion of 40-70 nm grains in the molecular sieve, % | Degree of crystallinity after hydro-thermal process, % |
|---|---|---|---|---|---|---|---|
| Example 1 | 918 | 152 | 0.43 | 6.3 | 35-80 | 88 | 89 |
| Example 2 | 870 | 180 | 0.53 | 6.5 | 20-90 | 93 | 86 |
| Example 3 | 851 | 177 | 0.49 | 6.0 | 30-95 | 85 | 84 |
| Example 4 | 805 | 143 | 0.45 | 5.5 | 22-80 | 81 | 80 |
| Example 5 | 947 | 102 | 0.39 | 5.2 | 30-92 | 80 | 78 |
| Example 6 | 860 | 192 | 0.55 | 4.6 | 26-86 | 85 | 75 |

TABLE 1-continued

Structural properties of the products in Examples and Comparative Examples

| | Specific surface area, $m^2/g$ | External specific surface area, $m^2/g$ | Pore volume, mL/g | Silica-alumina ratio | Grain distribution, nm | Proportion of 40-70 nm grains in the molecular sieve, % | Degree of crystallinity after hydro-thermal process, % |
|---|---|---|---|---|---|---|---|
| Example 7 | 821 | 132 | 0.42 | 5.3 | 23-85 | 83 | 77 |
| Example 8 | 846 | 150 | 0.41 | 5.0 | 30-80 | 82 | 83 |
| Example 9 | 842 | 124 | 0.43 | 5.7 | 25-88 | 82 | 82 |
| Comparative Example 1 | 843 | 63 | 0.36 | 5.2 | 180-350 | 0 | 76 |
| Comparative Example 2 | 816 | 120 | 0.40 | 3.3 | 60-180 | 25 | 50 |
| Comparative Example 3 | 720 | 130 | 0.45 | 3.2 | 20-85 | 77 | 43 |
| Comparative Example 4 | 821 | 102 | 0.38 | 4.2 | 20-100 | 60 | 60 |
| Comparative Example 5 | 855 | 101 | 0.41 | 4.5 | 50-100 | 52 | 62 |

TABLE 2

Catalytic properties of the products in Examples and Comparative Examples

| | Conversion rate (%) | Product distribution (%) | | | | |
|---|---|---|---|---|---|---|
| | | $C_5$+liquid | Diisopropylbenzene (DIPB) | Isopropylbenzene | Benzene | Carbon deposition |
| Example 1 | 93.4 | 72.5 | 19.3 | 36.2 | 17.0 | 5.0 |
| Example 2 | 95.3 | 70.4 | 21.5 | 32.8 | 16.1 | 4.3 |
| Example 3 | 91.8 | 71.6 | 18.1 | 34.3 | 19.2 | 15.4 |
| Example 4 | 84.0 | 65.3 | 25.6 | 30.2 | 9.5 | 6.2 |
| Example 5 | 83.3 | 64.6 | 27.1 | 25.2 | 12.3 | 7.0 |
| Example 6 | 78.4 | 68.2 | 26.2 | 30.8 | 11.2 | 5.1 |
| Example 7 | 83.5 | 64.8 | 23.2 | 28.9 | 12.7 | 6.0 |
| Example 8 | 75.3 | 66.7 | 26.7 | 29.5 | 10.5 | 6.4 |
| Example 9 | 82.0 | 65.4 | 20.6 | 31.7 | 13.1 | 7.3 |
| Comparative Example 1 | 43.8 | 54.6 | 30.3 | 19.1 | 5.2 | 28.7 |
| Comparative Example 2 | 45.5 | 65.9 | 26.4 | 26.1 | 13.4 | 11.9 |
| Comparative Example 3 | 42.8 | 69.0 | 26.2 | 30.2 | 12.6 | 6.7 |
| Comparative Example 4 | 57.6 | 60.6 | 25.4 | 25.1 | 10.1 | 10.6 |
| Comparative Example 5 | 62.3 | 58.5 | 28.1 | 21.9 | 8.5 | 10.7 |

As can be seen from the results of the above Table 1, the Y-type molecular sieve provided by the invention has small grain size, concentrated grain distribution, high silica-alumina ratio and good hydrothermal stability, and can meet the needs of industrial production. When the Y-type molecular sieve is used for preparing a catalyst, the performance of the catalyst is stable.

As illustrated by the results of the aforesaid Table 2, the Y-type molecular sieve provided by the invention exhibits desired cracking activity for the macromolecular reactants 1,3,5-triisopropylbenzene. The molecular sieve has a small grain size, a concentrated particle size distribution, and abundant acidic sites on an external surface, which are conducive to cracking of macromolecular reactants into micro-molecular products (isopropylbenzene and benzene). The molecular sieve has desirable diffusion properties for macromolecular reactants, and is not prone to form carbon deposit, thus the molecular sieve facilitates the long-term operation.

The invention claimed is:

1. A synthetic method of a Y-type molecular sieve, comprising:

S1: mixing a first silicon source, a first aluminum source, a first alkali source and water to form a mixture, subjecting the mixture to a first crystallization to obtain a directing agent A, an XRD spectrogram of the directing agent A does not contain a characteristic diffraction peak belonging to Y-type molecular sieve;

S2: adding one or more of a second silicon source, a second aluminum source, a second alkali source and water into the directing agent A and carrying out a second crystallization to obtain a directing agent B, which has a degree of crystallinity within a range of 5%-20%; and S3: adding one or more of a third silicon source, a third aluminum source, a third alkali source and water into the directing agent B and carrying out a third crystallization, wherein a molar ratio of $Na_2O:H_2O$ in S1 is lower than a molar ratio of $Na_2O:H_2O$ in S2 by 0.01-0.045.

2. The method of claim 1, wherein the molar ratio of $Na_2O:H_2O$ in S2 is higher than a molar ratio of $Na_2O:H_2O$ in S3 by 0.01-0.04.

3. The method of claim 1, wherein, in S1 the molar ratio of $Na_2O:Al_2O_3:SiO_2:H_2O$ is (7-14):1:(20-33):(300-650).

4. The method of claim 1, wherein the first crystallization temperature is higher than the second crystallization temperature by 5-60° C., and the first crystallization time is less than the second crystallization time by 8-37 h.

5. The method of claim 1, wherein the first crystallization in S1 is carried out at 70-100° C. for 4-12 hours.

6. The method of claim 1, wherein an amount of the directing agent A added in S2 accounts for 25-38 wt % of the total mass of the directing agent B, based on the mass of $Al_2O_3$.

7. The method of claim 1, wherein, in S2 the molar ratio of $Na_2O:Al_2O_3:SiO_2:H_2O$ is (17-26):1:(13-19):(400-618).

8. The method of claim 1, wherein the second crystallization in S2 is carried out at 40-70° C. for 15-41 hours.

9. The method of claim 1, wherein an amount of the directing agent B added in S3 accounts for 45-65 wt % of the one or more of the third silicon source, the third aluminum source, the third alkali source and water, based on the mass of $Al_2O_3$.

10. The method of claim 1, wherein, in S3 the molar ration of $Na_2O:Al_2O_3:SiO_2:H_2O$ is (12-20):1:(14-20):(550-1050).

11. The method of claim 1, wherein the third crystallization in S3 is carried out at 80-105° C. for 6-13 hours.

12. The method of claim 1, wherein the first, the second, and the third silicon sources are the same or different, and each is independently selected from one or more of water glass, silica sol, silica, and sodium silicate;

the first, the second, and the third aluminum sources are the same or different, and each is independently selected from one or more of sodium aluminate, sodium metaaluminate, aluminum powder, aluminum hydroxide, and aluminum isopropoxide; and the first, the second, and the third alkali sources are the same or different, and each is independently selected from one or more of sodium hydroxide, tetraethylammonium hydroxide, and tetrapropylammonium hydroxide.

* * * * *